(12) United States Patent
Kawamura (10) Patent No.: US 11,812,200 B2
(45) Date of Patent: Nov. 7, 2023

(54) HEAD-UP DISPLAY APPARATUS

(71) Applicant: JVCKENWOOD Corporation, Yokohama (JP)

(72) Inventor: Ken Kawamura, Yokohama (JP)

(73) Assignee: JVCKENWOOD CORPORATION, Yokohama (JP)

( * ) Notice: Subject to any disclaimer, the term of this patent is extended or adjusted under 35 U.S.C. 154(b) by 229 days.

(21) Appl. No.: 17/387,606

(22) Filed: Jul. 28, 2021

(65) Prior Publication Data

US 2021/0360211 A1    Nov. 18, 2021

Related U.S. Application Data

(63) Continuation of application No. PCT/JP2019/039969, filed on Oct. 10, 2019.

(30) Foreign Application Priority Data

Jan. 31, 2019    (JP) ................................ 2019-015117

(51) Int. Cl.
*H04N 9/31* (2006.01)
*G02B 27/01* (2006.01)
*B60K 37/02* (2006.01)

(52) U.S. Cl.
CPC ....... *H04N 9/3161* (2013.01); *G02B 27/0101* (2013.01); *B60K 37/02* (2013.01);
(Continued)

(58) Field of Classification Search
CPC .. H04N 9/3161; H04N 9/3158; H04N 9/3129; G02B 27/0101; G02B 2027/0141;
(Continued)

(56) References Cited

U.S. PATENT DOCUMENTS

| 5,361,165 A | 11/1994 | Stringfellow et al. |
| 10,234,683 B2 | 3/2019 | Okayama et al. |

(Continued)

FOREIGN PATENT DOCUMENTS

| JP | 2006-171465 A | 6/2006 |
| JP | 2009003324 A | 1/2009 |

(Continued)

*Primary Examiner* — Brent D Castiaux
(74) *Attorney, Agent, or Firm* — Procopio, Cory, Hargreaves & Savitch LLP (57) ABSTRACT

A head-up display apparatus projects a plurality of virtual images of which depths perceived by a user are different from each other. The head-up display apparatus includes a first projection apparatus and a second projection apparatus. The first projection apparatus includes a first display-light emitting unit configured to emit first display light, and a concave mirror configured to reflect the first display light and thereby emit reflected light thereof, and is configured to enable the user to perceive a first virtual image by projecting the reflected light onto a virtual-image display unit. The second projection apparatus includes a second display-light generation unit configured to let the reflected light pass therethrough and generate second display light different from the first display light, and is configured to enable the user to perceive a second virtual image by projecting the generated second display light onto the virtual-image display unit.

6 Claims, 5 Drawing Sheets

(52) U.S. Cl.
CPC ............. *B60K 2370/1529* (2019.05); *G02B 2027/0141* (2013.01)

(58) Field of Classification Search
CPC .................... B60K 37/02; B60K 35/00; B60K 2370/1529; B60K 2370/177; B60K 2370/178

See application file for complete search history.

(56) References Cited

U.S. PATENT DOCUMENTS

| | | | |
|---|---|---|---|
| 2010/0254019 A1* | 10/2010 | Cui | G01S 13/723 250/461.1 |
| 2011/0316721 A1 | 12/2011 | Chen | |
| 2016/0202479 A1 | 7/2016 | Okayama et al. | |
| 2018/0129042 A1* | 5/2018 | Yamazoe | G02B 13/16 |
| 2019/0235240 A1 | 8/2019 | Nagano et al. | |
| 2019/0258057 A1 | 8/2019 | Hada et al. | |

FOREIGN PATENT DOCUMENTS

| | | |
|---|---|---|
| JP | 3172678 U | 1/2012 |
| JP | 2012088357 A | 5/2012 |
| JP | 2018-086915 A | 6/2018 |
| JP | 2018146761 A | 9/2018 |
| JP | 2019008100 A | 1/2019 |
| WO | 2018088362 A1 | 5/2018 |
| WO | 2018/117012 A1 | 6/2018 |
| WO | 2018117012 A1 | 6/2018 |

* cited by examiner

HEAD-UP DISPLAY APPARATUS

CROSS REFERENCE TO RELATED APPLICATION

The present application is a Bypass Continuation of PCT/JP2019/039969 filed on Oct. 10, 2019, which is based upon and claims the benefit of priority from Japanese Patent Application No. 2019-015117, filed on Jan. 31, 2019, the disclosure of which are incorporated herein in its entirety by reference.

BACKGROUND

The present invention relates to a head-up display apparatus.

In vehicles such as automobiles, a head-up display apparatus for displaying information for a user on a windshield has been becoming widespread. A head-up display apparatus projects certain information onto a combiner composed of a transparent substrate or onto a windshield, so that a user such as a driver visually can recognize a virtual image. Further, in order to improve the usefulness of such a head-up display apparatus, a technique for displaying a plurality of virtual images at places having different distances from a user's viewpoint has been developed.

In a head-up display apparatus disclosed in Japanese Unexamined Patent Application Publication No. 2018-086915, a lens is disposed in a part of a light-emitting surface of a drawing device for generating display light, and a virtual image formed by light that passed through the lens and a virtual image that is formed by light that does not pass through the lens are recognized as if they are located at places having different distances from a user's viewpoint.

Further, in a display apparatus disclosed in Japanese Unexamined Patent Application Publication No. 2006-171465, a self-luminous type display panel is disposed in a reflection member that reflects projected display light. Further, a virtual image formed by reflected display light and a virtual image displayed by the self-luminous type display panel are recognized as if they are located at places having different distances from a user's viewpoint.

SUMMARY

However, in the technique disclosed in the Japanese Unexamined Patent Application Publication No. 2018-086915, since a screen image generated by one drawing device is divided into two images, there is a limit to the size of each of the virtual images. Further, if two drawing devices are disposed in order to eliminate the limitation in regard to the size of each virtual image, the size of the device may increase. In the technique disclosed in the Japanese Unexamined Patent Application Publication No. 2006-171465, when an image generated by the self-luminous type display panel is displayed as a virtual image, the maximum size of the virtual image becomes the actual size of the display panel, so that the expandability thereof is poor. Further, in order to display an image on the self-luminous type display panel in an enlarged manner, a combiner is required for the virtual-image projection surface.

An embodiment according to the present disclosure has been made in order to solve the above-described problem, and provides a head-up display apparatus of which the degree of freedom in designing is high and the expandability is excellent.

A head-up display apparatus according to an embodiment projects a plurality of virtual images of which depths perceived by a user with respect to a virtual-image display unit disposed in front of the user are different from each other. The head-up display apparatus includes a first projection apparatus and a second projection apparatus. The first projection apparatus includes a first display-light emitting unit configured to emit first display light, and a concave mirror configured to reflect the first display light and thereby emit reflected light thereof, and the first projection apparatus is configured to enable the user to perceive a first virtual image by projecting the reflected light onto a virtual-image display unit. The second projection apparatus includes a second display-light generation unit configured to let the reflected light pass therethrough and generate second display light different from the first display light, and the second projection apparatus is configured to enable the user to perceive a second virtual image by projecting the generated second display light onto the virtual-image display unit.

According to the embodiment, it is possible to provide a head-up display apparatus of which the degree of freedom in designing is high and the expandability is excellent.

DETAILED DESCRIPTION

For clarifying the explanation, the following description and the drawings are partially omitted and simplified as appropriate. The same reference numerals (or symbols) are assigned to the same elements throughout the drawings and redundant explanations thereof are omitted as appropriate.

First Embodiment

Embodiments according to the present invention will be described hereinafter with reference to the drawings. A head-up display apparatus according to this embodiment is an apparatus that projects a plurality of virtual images of which depths perceived by a user with respect to a virtual-image display unit disposed in front of the user are different from each other. More specifically, a head-up display apparatus according to this embodiment is an apparatus that is installed in an automobile, and is an apparatus that displays information for a driver, i.e., a user, by projecting a virtual image onto a windshield of the automobile or onto a combiner using the windshield or the combiner as a virtual-image display unit.

Figure 1:
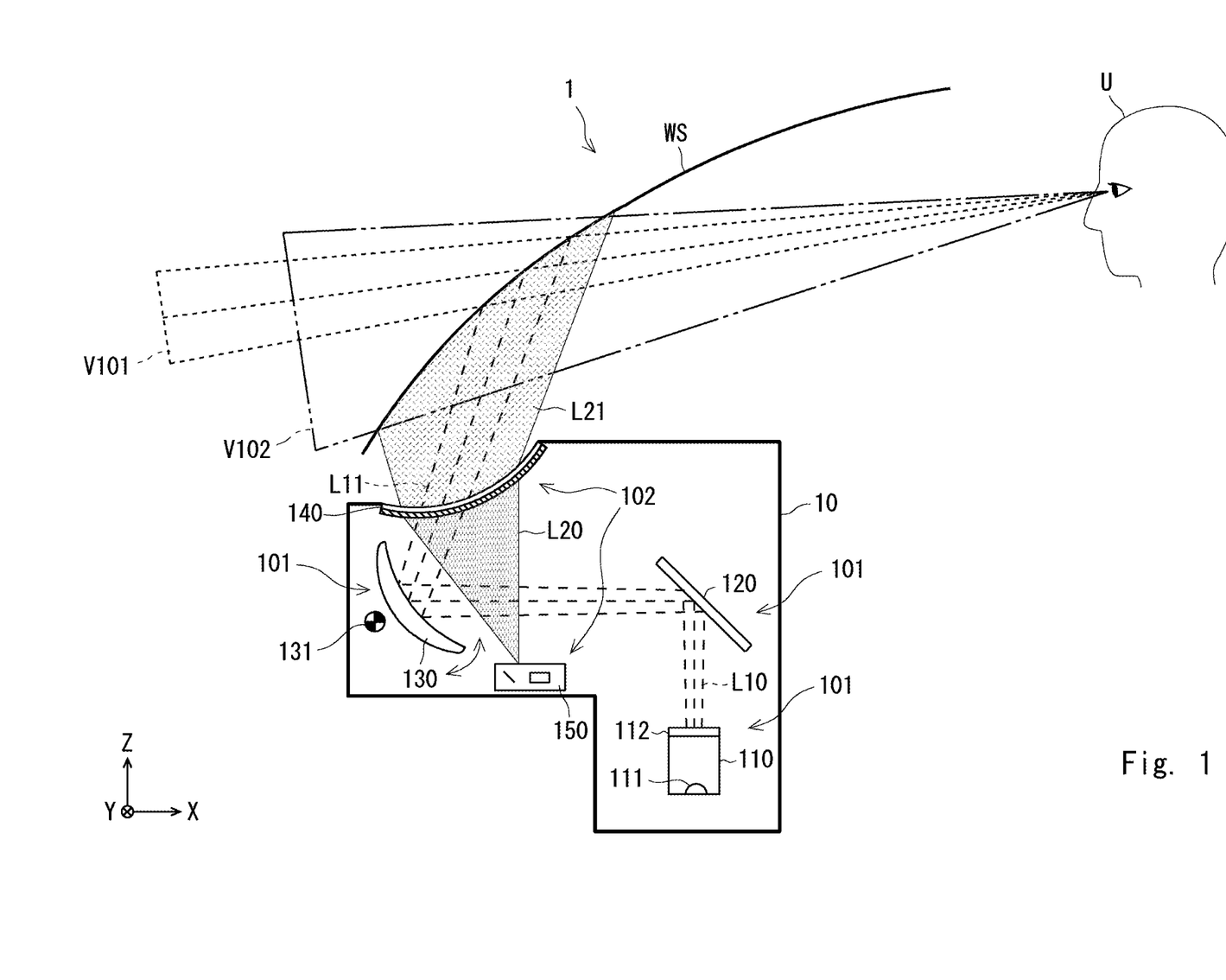
FIG. 1 is a schematic diagram showing a configuration of a head-up display apparatus according to a first embodiment.

A configuration of the head-up display apparatus according to the first embodiment will be described with reference to FIG. 1. FIG. 1 is a schematic diagram showing the configuration of the head-up display apparatus according to the first embodiment. FIG. 1 schematically shows an automobile 1, a user U of the automobile 1, and a head-up display apparatus 10. Note that, in FIG. 1, a right-handed orthogonal coordinate system is shown for the sake of convenience for explaining a positional relation among components. In the drawings, the X-axis coincides with the longitudinal direction of the automobile 1, and the X-axis positive direction coincides with the direction from the front of the automobile 1 toward the rear thereof. The Y-axis coincides with the left/right direction of the automobile 1, and the Y-axis positive direction coincides with the direction from the left of the automobile 1 toward the right thereof. The Z-axis coincides with the vertical direction of the automobile 1, and the Z axis positive direction coincides with the direction from the bottom of the automobile 1 to the top thereof. Further, in FIG. 2 and the subsequent drawings, when an orthogonal coordinate system is shown, the X-, Y-, and Z-axis directions in FIG. 1 coincide with the X-, Y-, and Z-axis directions in that orthogonal coordinate system, respectively.

As shown in the figure, the head-up display apparatus 10 is housed in a dashboard of the automobile 1 and projects a first virtual image V101 and a second virtual image V102 onto a windshield WS. The head-up display apparatus includes, as its main components, a first projection apparatus 101 and a second projection apparatus 102.

The first projection apparatus 101 projects the first virtual image V101 onto the windshield WS. The first projection apparatus 101 includes, as its main components, a first display-light emitting unit 110, a reflecting mirror 120, and a concave mirror 130.

The first display-light emitting unit 110 includes a first light source 111 and a first image display unit 112. The first display-light emitting unit 110 generates a first display light L10 by making light emitted from the first light source 111 pass through the first image display unit 112, and emits the generated first display light L10. The first display light L10 is display light for forming the first virtual image V101, and contains information to be displayed as the first virtual image V101 for the user U. The first light source 111 is composed of, for example, an LED(s) (Light Emitting Diode(s)) or a lamp. Further, the first image display unit 112 is composed of a transmission-type liquid-crystal panel or the like. The first display-light emitting unit 110 projects the generated first display light L10 onto the reflecting mirror 120. The reflecting mirror 120 reflects the first display light L10 received from the first display-light emitting unit 110 and projects the reflected light onto the concave mirror 130.

The concave mirror 130 generates reflected light L11 as the mirror having the concave shape receives and reflects the first display light L10 received through the reflecting mirror 120. The concave mirror 130 is configured so as to project the reflected light L11 onto the windshield WS. Further, in the concave mirror 130, the curved surface is formed so that the reflected light L11 projected by the concave mirror 130 forms an image having no distortion as viewed from the user U. Further, the first display light L10 is projected in a magnified manner by the concave mirror 130. Therefore, the first virtual image V101 perceived by the user U is larger than the image displayed by the first image display unit 112. Further, the reflected light L11 projected by the concave mirror 130 is projected onto the windshield WS after passing through a second display-light generation unit 140 (which will be described later). By the above-described configuration, the first projection apparatus 101 enables the user U to perceive the first virtual image V101.

Further, the concave mirror 130 includes a drive unit (not shown) that rotates the concave mirror 130 around a shaft 131 parallel to the Y-axis over a predetermined angle by using the shaft 131 as a fulcrum. As the drive unit rotates the concave mirror 130, the concave mirror 130 can change the direction of the reflected light L11. In this way, the head-up display apparatus 10 can suitably adjust the change in the place where the first virtual image V101 is displayed, which is caused as the height of the viewpoint of the user U changes.

The second projection apparatus 102 projects the second virtual image V102 onto the windshield WS. The second projection apparatus 102 includes, as its main components, the second display-light generation unit 140 and an excitation-light emitting unit 150.

The second display-light generation unit 140 lets the reflected light L11 generated by the first projection apparatus 101 pass therethrough, and generates second display light L21 different from the first display light L10. The second display light L21 generated by the second display-light generation unit 140 is projected onto the windshield WS, and thereby enables the user U to perceive the second virtual image V102.

The second display-light generation unit 140 is formed by using a plate-like transparent member having a concavely-curved upper surface as a substrate. In order to make the above-described reflected light L11 generated by the first projection apparatus pass the substrate, highly-transparent plastic such as polycarbonate or acryl, or highly-transparent glass is used for the substrate. By the concavely-curved upper surface, the second display-light generation unit 140 prevents external light coming from the outside of the automobile 1 from being reflected thereon into the interior of the vehicle. Further, the second display-light generation unit 140 prevents foreign substances from entering the head-up display apparatus 10. Note that the second display-light generation unit 140 is also referred to as a clear cover.

Figure 2:
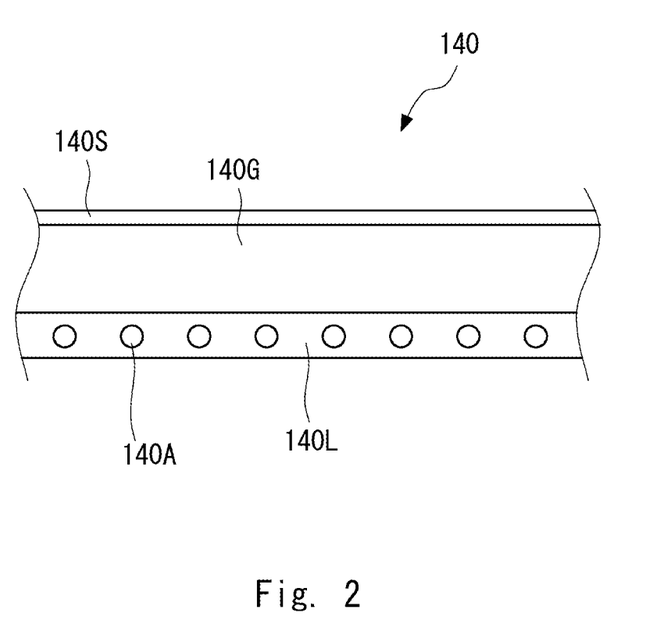
FIG. 2 is a cross-sectional view of a second display-light generation unit in the head-up display apparatus according to the first embodiment.

The second display-light generation unit 140 will be further described with reference to FIG. 2. FIG. 2 is a cross-sectional view of the second display-light generation unit in the head-up display apparatus according to the first embodiment. The second display-light generation unit 140 is composed of, as viewed from the top, a coating layer 140S, a substrate 140G, and a self-luminous layer 140L. The coating layer 140S is an AR (Anti-Reflection) coating that suppresses reflection of light and reflection of images. Further, the coating layer 140S may be one having a scratch-resisting function.

The substrate 140G is formed of a transparent polycarbonate material. Further, the substrate 140G has a thickness of, for example, about 1 millimeter in order to suppress unintended refraction which would otherwise occur when the reflected light L11 projected from the first projection apparatus 101 passes therethrough.

The self-luminous layer 140L contains a self-luminous material 140A in a binder material having a high visible-light transmittance. The self-luminous material 140A is a material that emits fluorescence, which is visible light, by receiving specific excitation light. Further, the specific excitation light is light having a specific frequency. For example, the specific excitation light is ultraviolet light. That is, the self-luminous material 140A in this embodiment is a material that emits fluorescence when it receives ultraviolet light having a specific frequency. Note that the position of the self-luminous material 140A is not limited to the lower layer of the second display-light generation unit 140, but may be an intermediate layer and/or an upper layer thereof.

Figure 3:
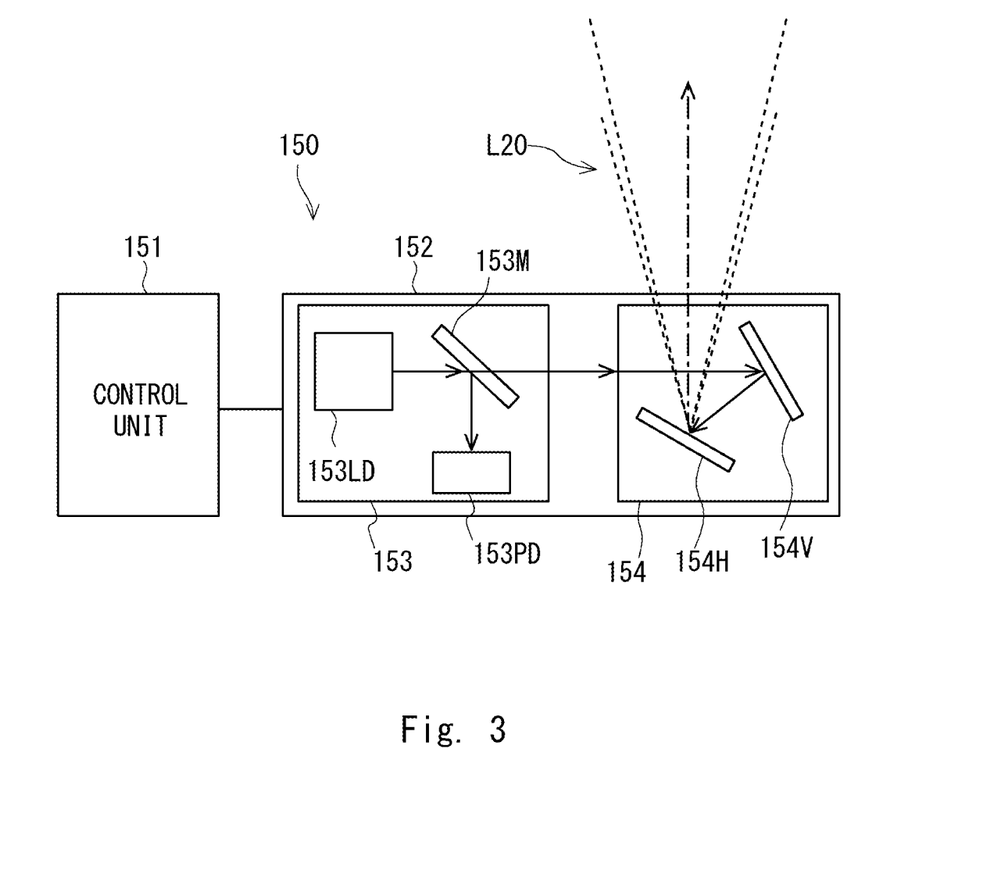
FIG. 3 is a schematic diagram showing a configuration of an excitation-light emitting unit according to the first embodiment.

Next, the excitation-light emitting unit 150 of the second projection apparatus 102 will be described with reference to FIG. 3. FIG. 3 is a schematic diagram showing a configuration of an excitation-light emitting unit according to the first embodiment. The excitation-light emitting unit 150 is a laser projector apparatus that projects ultraviolet laser light, which serves as excitation light, onto the second display-light generation unit 140. The excitation-light emitting unit 150 includes, as its main components, a control unit 151 and a laser light emitting unit 152. The control unit 151 includes a CPU (Central Processing Unit), a driver IC (Integrated Circuit), and the like, and has a function of appropriately controlling each component of the laser light emitting unit 152.

The laser light emitting unit 152 includes a laser light source unit 153 and a laser scanning unit 154. The laser light source unit 153 includes a laser diode(s) 153LD, a mirror 153M, and a photodetector 153PD. The laser diode 153LD generates ultraviolet laser light at a predetermined timing according to an instruction from the control unit 151, and supplies the generated ultraviolet laser light to the mirror 153M. The mirror 153M lets part of the ultraviolet laser light received from the laser diode 153LD pass therethrough and thereby outputs that part of the ultraviolet laser light, and reflects and supplies other part of the ultraviolet laser light to the photodetector 153PD. The photodetector 153PD detects (i.e., measures) the intensity of the ultraviolet laser light supplied from the mirror 153M, and feeds back a signal that is generated based on the detection to the control unit 151.

The laser scanning unit 154 generates excitation light L20 from the ultraviolet laser light received from the laser light source unit 153. The laser scanning unit 154 includes a first scanner mirror 154H and a second scanner mirror 154V. The first scanner mirror 154H makes the ultraviolet laser light perform to-and-fro movements over a predetermined angle along the horizontal scanning line of the second virtual image V102. The second scanner mirror 154V makes the ultraviolet laser light perform to-and-fro movements over a predetermined angle along the vertical scanning line of the second virtual image v102. The laser scanning unit 154 generates surface excitation light L20 by appropriately performing the scanning operations of the ultraviolet laser light, which is supplied from one point and travels in a straight line, along the two scanning lines orthogonal to each other.

By the above-described configuration, the excitation-light emitting unit 150 generates excitation light for forming the second virtual image V102, and projects the generated excitation light onto the second display-light generation unit 140. Further, when the excitation light is projected from the excitation-light emitting unit 150 onto the second display-light generation unit 140 as described above, a part of the second display-light generation unit 140 on which the excitation light is incident emits fluorescence. Then, the fluorescence emitted by the second display-light generation unit 140 is projected onto the windshield WS and is perceived by the user U as the second virtual image V102.

The description will be continued by referring to FIG. 1 again. As described above, the head-up display apparatus 10 projects each of the reflected light L11 generated by the first projection apparatus 101 and the second display light L21 generated by the second projection apparatus 102 onto the windshield WS. Note that, as shown in the figure, the length of the optical path for the first virtual image V101 from the first display-light emitting unit 110 to the windshield WS is longer than that of the optical path for the second virtual image V102 from the second display-light generation unit 140 to the windshield WS. Therefore, the user U perceives that the distance from his/her viewpoint to the first virtual image V101 is longer than the distance from his/her viewpoint to the second virtual image V102. In other words, the user U perceives that the first virtual image V101 is located more distant from him/her than the second virtual image V102 is. That is, the head-up display apparatus 10 can project a plurality of virtual images of which depths perceived by the user U are different from each other.

Further, as described above, the head-up display apparatus 10 is configured so that the place where the first virtual image V101 is displayed can be adjusted. That is, the head-up display apparatus 10 is configured so that the reflected light L11 can be moved within the range of the second display-light generation unit 140. Therefore, the head-up display apparatus 10 is configured so that the reflected light L11 becomes smaller than the second display-light generation unit 140 at the place where it passes through the second display-light generation unit 140. Therefore, the angle of view of the first virtual image V101 is smaller than that of the second virtual image V102. Alternatively, it can be said that the first virtual image V101 is included (i.e., confined) in the range in which the second virtual image V102 can be displayed. Therefore, since the head-up display apparatus 10 can display the second virtual image V102 of which the angle of view is larger than that of the first virtual image V101, it realizes a head-up display apparatus of which the expandability is excellent. Note that, in the above-described configuration, it is possible to make the angle of view of the second virtual image V102 smaller than that of the first virtual image V101.

Further, the excitation-light emitting unit 150 can change the direction of the projection of the excitation light L20 according to the position of the concave mirror 130. Therefore, in the head-up display apparatus 10, when the place where the first virtual image V101 is displayed is adjusted by driving the concave mirror 130, the place where the second virtual image V102 is displayed can be adjusted according to the place where the first virtual image V101 is displayed. In this case, for example, the control unit 151 detects the angle of the concave mirror 130, and adjusts the timing at which the laser light source unit 153 emits light according to the detected angle of the concave mirror 130. By adjusting the light emitting timing of the laser light source unit 153, the excitation-light emitting unit 150 can adjust the direction of the image projected by the laser light emitting unit 152.

Note that although the excitation-light emitting unit 150 is disposed near the concave mirror 130 and behind the concave mirror 130 (on the positive side in the X-axis direction) in the figure, the position of the excitation-light emitting unit 150 is not limited to the position shown in the figure as long as it does not interfere with either of the first display light L10 generated by the first projection apparatus and the reflected light L11 thereof. That is, the excitation-light emitting unit 150 of the second projection apparatus 102 may have any configuration as long as it projects excitation light to the second display-light generation unit 140 in an incident direction different from the incident direction in which the reflected light L11 is projected onto the second display-light generation unit 140. Therefore, the degree of freedom in designing of the second projection apparatus 102 is high. That is, according to the first embodiment, it is possible to provide a head-up display apparatus of which the degree of freedom in spatial designing is high and the increase in volume is minimized.

Figure 4:
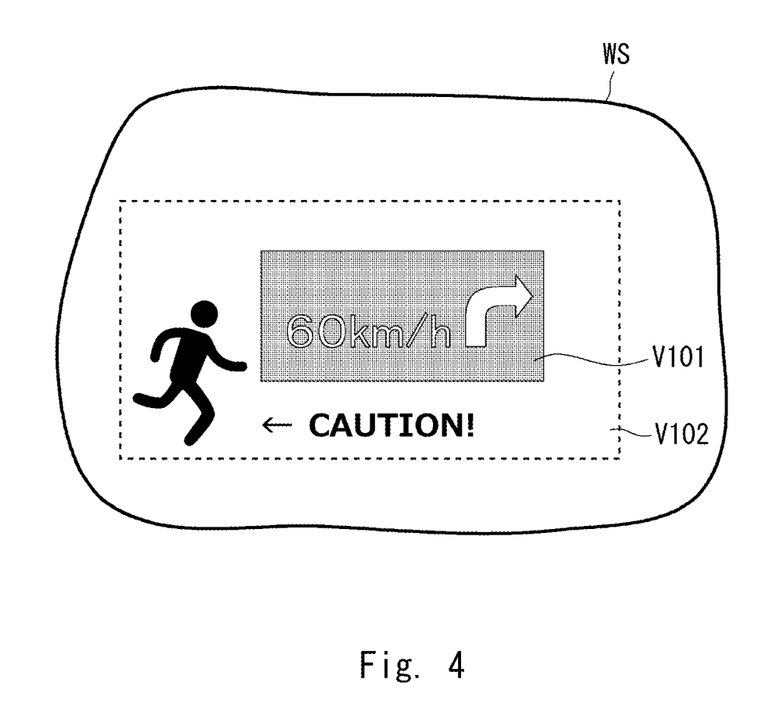
FIG. 4 shows an example of a virtual image projected by a head-up display apparatus.

Next, an example of a virtual image displayed by the head-up display apparatus 10 will be described with reference to FIG. 4. FIG. 4 shows an example of a virtual image projected by the head-up display apparatus. The virtual image shown in the figure shows a virtual image perceived by the user U.

As shown in the figure, the user U perceives a first virtual image V101 and a second virtual image V102. In the example shown in the figure, in the first virtual image V101, a traveling speed (60 km/h) of the automobile 1 and guide information (i.e., an arrow indicating a right turn) for a traveling route are displayed. By displaying such information in the first virtual image V101, a user U can obtain information necessary for the driving as appropriate while minimizing the movement of the line of sight of the user U and the change of the focal distance of the eyes during the driving.

Meanwhile, in the second virtual image V102, an icon indicating that a pedestrian is approaching from the left side, and a message urging attention thereto are displayed. By displaying such information in the second virtual image V102, which the user U perceives as being located closer to him/her than the first virtual image V101 is, the head-up display apparatus 10 can make the user U have a sense of urgency. Further, by using the second virtual image V102 having an angle of view larger than that of the first virtual image V101, it is possible to effectively call attention to the user U without interfering with the display of normal information displayed during the traveling. Further, the brightness of the second display light L21 for displaying the second virtual image V102 can be changed by changing the intensity of the ultraviolet laser light. Therefore, the head-up display apparatus 10 can adjust the brightness of the second virtual image V102 by changing the intensity of the excitation light.

The first embodiment has been described above, but it should be noted that the head-up display apparatus 10 according to the first embodiment is not limited to the above-described configuration. For example, the laser light emitting unit 152, which is one of the components of the excitation-light emitting unit 150, may be configured so as to emit a surface emitting laser. Further, the laser scanning unit 154 may be a DLP (Digital Light Processing) unit.

Further, the self-luminous material 140A may be contained in a plurality of layers in the second display-light generation unit 140. In this case, the self-luminous material(s) may be one(s) that emits fluorescence, which is visible light, by receiving excitation light having a different frequency in each of the layers.

As described above, the head-up display apparatus displays an image for forming a second virtual image on the second display-light generation unit, which is a clear cover, and thereby projects a plurality of virtual images of which depths are different from each other while minimizing the increase in volume thereof. Therefore, according to the first embodiment, it is possible to provide the head-up display apparatus of which the degree of freedom in designing is high and the expandability is excellent.

Second Embodiment

Next, a second embodiment will be described. A configuration for generating a second virtual image in a head-up display apparatus according to the second embodiment is different from that in the first embodiment. Differences from the first embodiment will be described hereinafter.

Figure 5:
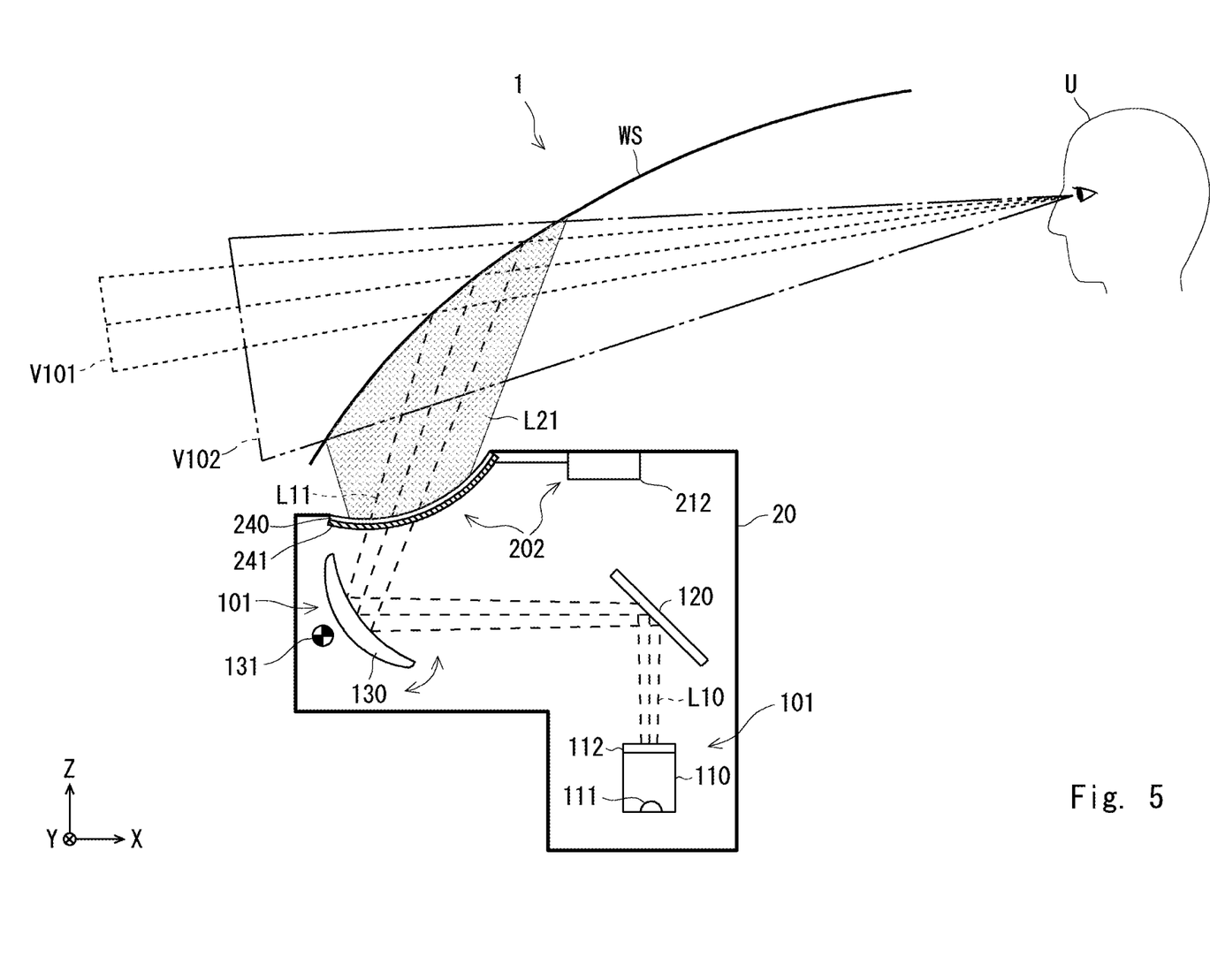
FIG. 5 is a schematic diagram showing a configuration of a head-up display apparatus according to a second embodiment.

FIG. 5 is a schematic diagram showing a configuration of a head-up display apparatus according to the second embodiment. The head-up display apparatus 20 shown in the figure includes a second projection apparatus 202 in place of the second projection apparatus 102.

The second projection apparatus 202 includes, in place of the laser projector apparatus for projecting ultraviolet laser light, a transmission-type display panel and a driver circuit for driving the display panel. The second projection apparatus 202 includes a second display-light generation unit 240 and a second display-light control unit 212.

The second display-light generation unit 240 includes a transmission-type display panel 241 which uses a plate-like member having a high visible-light transmittance as a substrate. The transmission-type display panel 241 is composed of, for example, an organic EL (Electro Luminescence) display panel. That is, the second display-light generation unit 240 includes a layer that lets reflected light L11, which is visible light, pass therethrough and emits light by itself. Note that the display panel 241 may be a transmission-type liquid-crystal panel instead of the organic EL display panel.

The second display-light control unit 212 is connected to the second display-light generation unit 240, and is a circuit including a driver IC for controlling the display panel 241 of the second display-light generation unit 240. Note that the second display-light control unit 212 can be disposed at an arbitrary place as long as it does not interfere with either of the first display light L10 generated by the first projection apparatus and the reflected light L11 thereof.

As described above, the head-up display apparatus 20 according to the second embodiment displays an image for forming a second virtual image on the second display-light generation unit, which is a clear cover, and thereby projects a plurality of virtual images of which depths are different from each other while minimizing the increase in volume. Therefore, according to the second embodiment, it is possible to provide the head-up display apparatus of which the degree of freedom in designing is high and the expandability is excellent.

Note that the present invention is not limited to the above-described embodiments, and they may be modified as appropriate without departing from the spirit and scope of the invention. For example, the above-described head-up display apparatus can be applied to vehicles other than automobiles, such as aircrafts and ships. Further, the objects or the like to which the above-described head-up display apparatus is applied is not limited to vehicles. That is, the head-up display apparatus may be applied to driving simulators for automobiles, flight simulators for airplanes, video-game apparatuses, and the like.

What is claimed is:

1. A head-up display apparatus configured to project a plurality of virtual images of which depths perceived by a user with respect to a virtual-image display unit disposed in front of the user are different from each other, the head-up display apparatus comprising:

a first projection apparatus comprising a first display-light emitting unit configured to emit first display light, and a concave mirror configured to reflect the first display light and thereby emit reflected light thereof, the first projection apparatus being configured to enable the user to perceive a first virtual image by projecting the reflected light onto a virtual-image display unit; and a second projection apparatus comprising a second display-light generation unit configured to let the reflected light pass therethrough and generate second display light different from the first display light, the second projection apparatus being configured to enable the user to perceive a second virtual image by projecting the generated second display light onto the virtual-image display unit, and the second display-light generation unit containing a self-luminous material, and being configured to generate the second display light as the self-luminous material emits light,
wherein the second virtual image projected by the second projection apparatus has a larger angle of view than an angle of view of the first virtual image projected by the first projection apparatus, and
wherein the second projection apparatus adjusts a place where the second virtual image is displayed according to a place where the first virtual image when the first projection apparatus drives the concave mirror to adjust the place where the first virtual image is displayed.

2. The head-up display apparatus according to claim 1, wherein
the second projection apparatus further comprises an excitation-light emitting unit configured to project excitation light having a predetermined wavelength onto the second display-light generation unit, and
the second display-light generation unit emits light by receiving the excitation light.

3. The head-up display apparatus according to claim 2, wherein the excitation-light emitting unit comprises an ultraviolet-light laser emitting unit configured to emit an ultraviolet-light laser, and a scanning unit configured to project the ultraviolet-light laser onto the second display-light generation unit by performing scanning with the ultraviolet-light laser.

4. The head-up display apparatus according to claim 2, wherein the second projection apparatus projects the excitation light onto the second display-light generation unit in an incident direction different from an incident direction in which the reflected light is projected onto the virtual-image display unit.

5. The head-up display apparatus according to claim 1, wherein the second virtual image, which the user can perceive by the second projection apparatus, has an angle of view larger than that of the first virtual image, which the user can perceive by the first projection apparatus.

6. The head-up display apparatus according to claim 1, further comprising:
a control unit that detects an angle of the concave mirror and adjusts a direction of the second virtual image projected by the second projection apparatus by adjusting a light emitting timing of the second display light according to the detected angle of the concave mirror.

* * * * *